3,547,886
ONE POT EPOXY COMPOSITIONS CONTAINING KETIMINE CURING AGENTS

Ross Gardner, Jr., Stoughton, and Allen H. Keough, Sudbury, Mass., assignors to Norton Research Corporation, Cambridge, Mass., a corporation of Massachusetts
No Drawing. Continuation-in-part of application Ser. No. 531,074, Mar. 2, 1966. This application Apr. 15, 1968, Ser. No. 721,172
Int. Cl. C08g *30/14*
U.S. Cl. 260—47
7 Claims

ABSTRACT OF THE DISCLOSURE

A one pot epoxy resin composition having long pot life and room temperature curability in the presence of water, said composition containing an epoxy resin which is curable at room temperature by a primary amine and an imine formed from the reaction of the —$NH_2$ group(s) of an amine with ketones containing no more than one alpha hydrogen per alpha carbon.

CROSS-REFERENCE TO RELATED APPLICATION

This application is a continuation-in-part of copending application Ser. No. 531,074, filed Mar. 2, 1966, now abandoned.

BACKGROUND OF THE INVENTION

This invention relates to polyepoxide compositions containing novel imine curing agents, the composition having long "pot life" at room temperature when stored under anhydrous conditions but capable of rapid curing when the composition is exposed to water.

This invention also relates to novel imines useful not only as curing agents for polyepoxides as stated above, but also useful as: curing agents for polyisocyanates; intermediates for making substituted ketones as outlined in the Journal of the American Chemical Society, volume 85, page 2178 (see also U.S. Pat. 3,230,216) which are useful as organic solvents and as precursors whenever ketone or amine generation is required.

The imines of the present invention are characterized by their having only one alpha hydrogen per alpha carbon. The carbon atoms attached to the carbonyl or imine groups are referred to as alpha carbons, and the hydrogens attached to these alpha carbons are called alpha hydrogens.

Polyepoxide compositions can be cured to hard, tough, durable products having excellent physical, chemical and electrical properties. However, their use has been hindered by the difficulty of providing a premixed composition of epoxy resin and curing agent which has both (a) long pot life, and (b) room temperature curing. Those materials in the prior art which have had long pot life for the mixed epoxy resin and curing agent have normally required high temperature cures. Similarly, those materials which can cure at room temperature have had relatively short pot life.

Certain improvements in "one pot" epoxy resins have been described in British Pat. 972,988. This patent is directed to the use of mixtures of epoxy resins and a curing agent consisting of an imine, with the "one pot" epoxy having a relatively short pot life, i.e. measured in terms of days.

Recently, U.S. Pat. 3,291,775 disclosed the use of aliphatic imines as curing agents for polyepoxides. This patent discloses aliphatic saturated ketones and polyamines as starting materials in the preparation of imines. All of the saturated aliphatic ketones disclosed in U.S. Pat. 3,291,775 and British Pat. 972,988 react to give imines having methyl or methylene groups alpha to the carbon-nitrogen double bond, thus greatly reducing the chances of steric hindrance impeding the formation of the desired imine. As one replaces the methyl or methylene groups with bulkier groups, the steric factors work against formation of the imine.

Accordingly, it is a principal object of the present invention to provide a one-pot epoxy composition containing intimate mixtures of an epoxy resin curing agent which has a pot life measured in terms of months and a room temperature cure.

It is another principal object of the present invention to provide imines of sterically hindered ketones.

Another object of the invention is to provide a one-pot epoxy composition which contains an imine of a ketone containing little or no alpha hydrogen.

Another object of the invention is to provide imines of ketones having little or no alpha hydrogen.

Still another object of the present invention is to provide imines having great utility as chemical intermediates.

Yet another object is to provide precursors for ketone and amine generation.

Other objects of the present invention will in part be obvious and will in part appear hereinafter.

The present invention accordingly comprises the product possessing the features, properties, and the relation of components which are exemplified in the following detailed disclosure, and the scope of the application which will be indicated in the claims.

SUMMARY OF THE INVENTION

In the present invention an amine is reacted with an aliphatic ketone containing little or no alpha hydrogen, producing an imine which can be intimately mixed with epoxy resins to form compositions which are stable for many months or which can be used in a manner as discussed herein. The substituted imine must be free of any primary or secondary amino hydrogen if it is to be mixed with an epoxy resin to form a "one pot" epoxy composition. When the aliphatic ketone is not cyclic, it is preferred that it contains only tertiary or quaternary alpha carbon atoms.

The general formula for the novel imines is:

$$\left[ \begin{array}{c} R_4 \\ | \\ R_3 \\ | \\ R \\ | \\ R_1-C- \\ | \\ R_2 \end{array} X \right]_m \begin{array}{c} R_4 \\ | \\ R_3 \\ || \\ N \\ || \\ -C- \end{array} \left[ X \right]_n \begin{array}{c} R_4 \\ | \\ R_3 \\ | \\ N \\ || \\ R \\ | \\ -C-R_1 \\ | \\ R_2 \end{array} \quad (I)$$

where X is a keto containing hydrocarbon radical whose ketone oxygen has been replaced by nitrogen as shown. X should have no more than one hydrogen on each carbon alpha to each keto group, and in addition should be chosen so that there is no more than one hydrogen on each atom of X bonded to the C=N—$R_3$—$R_4$ group in the center of the molecule of Formula I. Furthermore, X should be chosen so as to give no beta diimine groups in the final imine molecule (Formula I). Beta diimine groups are present whenever two imine groups (C=N) are attached to the same carbon in a manner as outlined by the following formula:

$$\begin{array}{c} N \quad N \\ || \quad || \\ C-C-C \end{array}$$

R can be hydrogen, halogen, or an alkyl radical. The carbon atoms attached to the carbonyl or imine groups are referred to as alpha carbons, and R is the only substituent attached to an alpha carbon that can be hydrogen.

In Formula I and the following formulae, $R_1$ and $R_2$ can be halogen; alkoxy; hydroxyl; alkyl; a portion of a cyclic saturated group; and halogen, hydroxyl and alkoxy substituted alkyl and cyclic saturated groups. $R_1$ and $R_2$ can be part of the same cyclic saturated group or a part of different cyclic saturated groups. When $R_1$ and $R_2$ are part of the same cyclic saturated group, C is also part of that same cyclic saturated group.

Ketones useful in the present invention can be symmetrical or unsymmetrical, the only criteria being that when they are reacted to give an imine they satisfy Formula I.

In Formula I and the following formulae $R_3$ is selected from the group consisting of hydrocarbon radicals containing up to 40 carbon atoms, substituted hydrocarbon radicals and derivatives of hydrocarbon radicals, secondary amines and polymeric amines. Hydrocarbon radicals and derivatives of hydrocarbon radicals are intended to include sulfide, silicone, polyurethane, polyamide, etc. containing radicals: The choice of $R_3$ is not critical as long as any secondary amino hydrogen contained in the $R_3$ residue are reacted prior to the imine forming reaction or are reacted thereafter with an epoxy resin-formed amino alcohol of the resin if the imines ultimate use is in a "one pot" epoxy composition.

$R_4$ can be hydrogen or nitrogen doubly bonded to a compound selected from the group consisting of

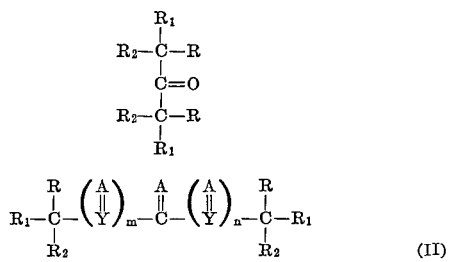

Y is a hydrocarbon radical having no more than one hydrogen on each carbon alpha to the carbon of Y doubly bonded to A. Y can have no more than one hydrogen on each atom of Y bonded to C=A, with Y also being selected so as to give no beta diimine groups in the final imine molecule (Formula I). One of the A's on Formula II must be oxygen so that it can be replaced in reaction with —$NH_2$. If more than one A is present, they are selected from the group consisting of

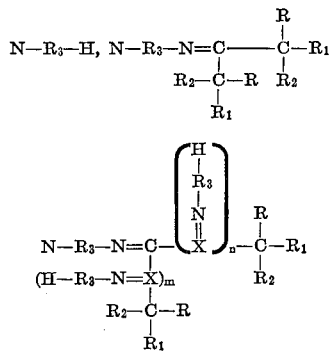

and similar groups such that the only portion of Formula I capable of having ketone groups unreacted with —$NH_2$ is $R_3$.

In all of the formulae $m$ and $n$ are integers from 0–3. When the desired imine is not initially intended to be used in a one pot or one component system, $R_4$ is replaced in the formulae described herein by $R'_4$. $R'_4$ is defined the same way $R_4$ is defined except $R'_4$ cannot be hydrogen.

Preferred ketones of the present invention are: diisopropyl ketone; dicyclopropyl ketone; dicyclohexyl ketone; ditertiary butyl ketone; dicyclopentyl ketone; ditetrahydrofuranyl ketone; perfluoro acetone; ditetrahydrothiophenyl ketone; ditetrahydropyranyl ketone; and mixtures thereof; although any ketone which when reacted to form an imine satisfies Formula I, and mixtures of ketones, each of which satisfies Formula I when reacted to give an imine are generally satisfactory for practicing the concept of the present invention.

Preferred amines of the present invention are: ethylene diamine; m-xylene diamine; 1,3-propane diamine; $C_1$–$C_{40}$ monoamines; 1,6-hexanediamine; diethylene triamine, and mixtures thereof; although any amine which when reacted to form an imine satisfies Formula I and mixtures of amines each of which when reacted to form the imine satisfies Formula I, are generally satisfactory for practicing the concept of the present invention. Holm, in U.S. Pat. 3,291,775 lists many amino terminated compounds useful as reactants in forming imines and all disclosure in that patent relevant to amino terminated compounds is herein incorporated by reference.

The epoxy resins with which the substituted imines can be mixed may be any of those normally used in the production of amine cured epoxy resins. In general, the diglycidyl ether of bisphenol-A resins are normally used but other epoxy resins such as epoxy-novolac resins, cycloaliphatic epoxy resins, halogenated epoxy resins and flexibilizing epoxy resins may be equally employed, the principal requirement being that the resin have at least two epoxy groups available for reaction with the amino hydrogens of the amine. Numerous examples of suitable epoxy resins are given in U.S. Pats. 2,904,530, 2,817,644, 3,018,258, and 3,091,595, the disclosures of which are incorporated herein by reference. An excellent discussion of various types of epoxy resins and the curing thereof by primary aliphatic amines is given in "Handbook of Epoxy Resins," Lee and Neville, McGraw-Hill, 1967.

It is believed that the explanation for the long pot life of the imine-epoxy resin mixture of the present invention results from the relative freedom from tautomerism of the imines. Thus, referring to Formula I, it can be seen that there can be only one hydrogen (R) on each alpha carbon. Since this single hydrogen is weakly acidic, there is very little tendency for this hydrogen to travel to the nitrogen atom of the N=C bond as indicated below:

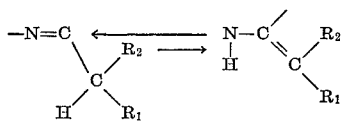

Accordingly, the imine (I) will remain free of amino hydrogen and will thus be essentially inert to the epoxy resin for long periods of time.

DESCRIPTION OF THE PREFERRED EMBODIMENTS

In order that the invention may be more fully understood, reference should be had to the following non-limiting examples.

EXAMPLE I

Preparation of N,N'-bis(2,4-dimethyl-3-pentylidene) ethylene diamine

A mixture of 1.0 mole (114.2 gm.) of diisopropyl ketone is reacted with 0.5 mole (30.1 gm.) of ethylenediamine by refluxing with 500 m. of benzene in a 2000 ml. round bottom flask fitted with a Dean-Stark water separator.

The separator was provided with a drain and the reflux condenser was capped with a drierite tube. A few crystals of iodine were added as catalyst. The reaction appeared exceptionally slow and was allowed to continue for 96 hours at which time 18 mls. of $H_2O$ was collected (theory 18 mils.). Upon fractionation the following fractions were obtained:

| Fraction No. | Boiling range | Wt., gm. | Yield, percent |
|---|---|---|---|
| 1 | Rm. temp.–81°/0.15 mm | 2.7 | |
| 2 | 76°/0.1 mm | 41.7 | 33 |
| 3 | | | |

After refractionation, the sample upon standing began to partially crystallize at room temperature. An infrared spectogram of the product confirms its being the diimine as a strong absorption takes place at 1660–1650 cm.$^{-1}$ while the N–H stretching region (3500–3200 cm.$^{-1}$) has no noticeable absorption. The diimine product was then mixed with a commercial epoxy resin (Epon 812–Shell) in the proportion of 42 phr. (i.e. 42 parts/100 parts resin on a weight basis). When this mixture was packaged under anhydrous conditions, it retained its fluidity for more than 200 days. After the storage for more than 200 days, the resin-diimine mixture was spread on a glass slide and exposed to moist air 72° F. 38% relative humidity. This mixture set to a hard film within 16 hours.

When an application requires a thick film, water can be added directly to the resin-imine mixture before applying it.

In general water can be added directly to the resin-imine mixture before use for any purposes as this procedure usually reduces the time for cure.

Analysis of $C_{16}H_{32}N_2$ (fraction 2). Calculated (percent): C, 76.12; H, 12.78; N, 11.10. Found (percent): C, 75.80; H, 12.89; N, 10.89.

EXAMPLE II

Preparation of N, N' bis(2, 4-dimethyl-3-pentylidene) 1, 3-propane diamine

A mixture of 2.1 mole (240.0 gm.) of diisopropyl ketone is reacted with 1.05 mole (77.6 gm.) of 1, 3-propane diamine in a solvent consisting of 400 mls. of benzene and 400 ml. of xylene. A few crystals of iodine were added and the reaction was allowed to proceed in a manner similar to that outlined in Example 1. Upon fractionation the desired imine was collected at 92° C. @ 0.1 mm.

Analysis of $C_{17}H_{34}N_2$. Calculated (percent): C, 76.63; H, 12.86; N, 10.51. Found (percent): C, 76.45; H, 12.79; N, 10.48.

The imines of the present process are also useful for curing isocyanate-terminated adducts or prepolymers as outlined in Polyurethanes: Chemistry and Technology, J. H. Saunders and K. C. Frisch, Interscience, John Wiley and Sons, 1962. Here, as is the case in the curing of polyepoxides, the alpha hydrogen criteria of the imines of the present invention make them ideally suited for one component coating systems.

U.S. Pat. 3,230,216 teaches a method for the preparation of alpha substituted organic carbonyl compounds using monoimines as unisolated intermediates. The alpha hydrogen bearing diimines of the present process could also be utilized in a similar method.

Various fillers, pigments, etc. may be added to the compositions of the present invention without departing from the present inventive concept.

Since certain changes can be made in the above described products without departing from the scope of the invention herein involved, it is intended that all matter contained in the above description shall be interpreted as illustrative and not in a limiting sense.

What is claimed is:

1. An epoxy resin composition having long pot life and room temperature hardening ability upon exposure to water, said composition comprising a room temperature primary amine curable epoxy resin having at least two vicinal epoxy groups, and an imine of an amine and an aliphatic ketone, said imine having the formula

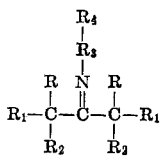

wherein:
(a) each carbon atom alpha to each carbon double bonded to nitrogen has no more than one hydrogen;

(b) R is selected from the group consisting of hydrogen, halogen and alkyl;
(c) $R_1$ is selected from the group consisting of halogen, alkoxy, hydroxyl, alkyl, and halogen, hydroxyl and alkoxy substituted alkyl;
(d) $R_2$ is selected from the group consisting of halogen, alkoxy, hydroxyl, alkyl, and halogen, hydroxyl and alkoxy substituted alkyl;
(e) $R_1$ may also be alkylene, and $R_2$ may also be alkylene, oxyalkylene, or thioalkylene where $R_1$ and $R_2$ are joined to form, together with the carbon atom to which $R_1$ and $R_2$ are both linked, a saturated carbocyclic or heterocyclic ring selected from the group consisting of cycloalkyl with three to six carbon atoms, tetrahydrofuranyl, tetrahydrothiophenyl, and tetrahydropyranyl;
(f) $R_3$ is selected from the group consisting of hydrocarbon radicals containing up to 40 carbon atoms;
(g) $R_4$ is selected from the group consisting of hydrogen and nitrogen doubly bonded to a divalent radical having the formula

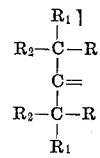

wherein R, $R_1$ and $R_2$ are as defined above and each carbon atom alpha to each carbon double bonded to nitrogen has no more than one hydrogen.

2. The composition of claim 1 wherein R is selected from the group consisting of hydrogen and methyl, and $R_1$ and $R_2$ are methyl.

3. The composition of claim 1 wherein R is hydrogen and $R_1$ and $R_2$ are joined to form a cyclic saturated group selected from the group consisting of cyclopropyl and cyclohexyl.

4. The composition of claim 1 wherein R is hydrogen and $R_1$ and $R_2$ are joined to form a cyclic saturated group selected from the group consisting of cyclopentyl, tetrahydrofuranyl, tetrahydrothiophenyl, and tetrahydropyranyl.

5. The composition of claim 1 wherein R, $R_1$ and $R_2$ are fluorine.

6. The composition of claim 1 wherein $R_3$ is selected from the group consisting of —CH$_2$—CH$_2$—, —CH$_2$—CH$_2$—CH$_2$—, —CH$_2$—(CH$_2$)$_4$—CH$_2$—,

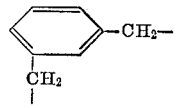

and $C_1$–$C_{40}$ hydrocarbon radicals.

7. An epoxy resin composition having long pot life and room temperature hardening ability upon exposure to water, said composition comprising a room temperature primary amine curable epoxy resin having at least two vicinal epoxy groups, and an imine of an aliphatic monoketone and an amine, said imine being free of secondary amino hydrogen, said imine having each primary amino group substituted by reaction with a ketone having no more than one hydrogen on each alpha carbon.

References Cited

UNITED STATES PATENTS 3,291,775  12/1966  Holm _____ 260—47
3,378,600  4/1968  Hodges _____ 260—830

WILLIAM H. SHORT, Primary Examiner

E. A. NIELSEN, Assistant Examiner

U.S. Cl. X.R.

260—2, 77.5